United States Patent
Ewert et al.

[11] Patent Number: 6,006,808
[45] Date of Patent: Dec. 28, 1999

[54] LABEL TAMP

[75] Inventors: Brian C. Ewert; Mark B. Ewert, both of Charlotte, N.C.; John S. Roberts, Carson City; George S. Patterson, Dayton, both of Nev.

[73] Assignee: J.I.T. Technologies, Inc., Graham, N.C.

[21] Appl. No.: 09/074,349

[22] Filed: May 7, 1998

[51] Int. Cl.$^6$ .............. B44C 31/00; B31F 5/00; B65C 9/08; B65C 9/18
[52] U.S. Cl. ............ 156/556; 156/541; 156/542; 156/566; 156/DIG. 33
[58] Field of Search .................... 156/556, 540, 156/541, 542, DIG. 33, DIG. 31

[56] References Cited

U.S. PATENT DOCUMENTS

| | | | |
|---|---|---|---|
| 4,595,447 | 6/1986 | Lindstrom | 156/542 X |
| 4,844,771 | 7/1989 | Crankshaw et al. | 156/542 X |
| 5,232,539 | 8/1993 | Carpenter et al. | 156/542 X |
| 5,236,535 | 8/1993 | Smith | 156/542 X |
| 5,300,181 | 4/1994 | Yamaguchi | 156/542 |
| 5,435,862 | 7/1995 | Williams et al. | 156/541 X |
| 5,472,552 | 12/1995 | Speranza et al. | 156/542 X |
| 5,753,072 | 5/1998 | Taylor | 156/541 X |

FOREIGN PATENT DOCUMENTS

| | | | |
|---|---|---|---|
| 0131852 | 7/1984 | European Pat. Off. | B65C 9/18 |
| 52-17800 | 10/1977 | Japan | 156/541 |
| 1437463 | 5/1976 | United Kingdom | 156/541 |
| 2035255 | 6/1980 | United Kingdom | 156/542 |

*Primary Examiner*—Richard Crispino
*Assistant Examiner*—Sue A. Purvis
*Attorney, Agent, or Firm*—Christopher C. Dremann PC; Christopher C. Dremann

[57] ABSTRACT

A label tamp is provided for delivering and applying a linerless adhesive label to the outside surface of a container transported on a conveyor to the labeling station of a production line. The label tamp includes a tamp cylinder defining an axis of extension that is generally normal to the outside surface of the container, a tamp arm secured to the tamp cylinder such that the tamp arm is alternately extensible and retractable, a tamp arm base plate rigidly fixed to the tamp arm and a tamp head assembly. Preferably, the tamp head assembly is secured to a lift plate has a pair of parallel recesses for receiving a pair of linear actuators therein so that the tamp head assembly is linearly movable relative to the tamp arm base plate. Preferably, the tamp head assembly includes a tamp head resiliently mounted to a tamp head mounting plate so that the tamp head is rotatable in any combination about orthoganol axes perpendicular to the axis of extension of the tamp cylinder, and is linearly movable in a direction parallel to the axis of extension of the tamp cylinder. Preferably, the tamp head is resiliently mounted to the tamp head mounting plate by a plurality of springs positioned on a corresponding plurality of shoulder bolts between the tamp head and the tamp head mounting plate.

15 Claims, 4 Drawing Sheets

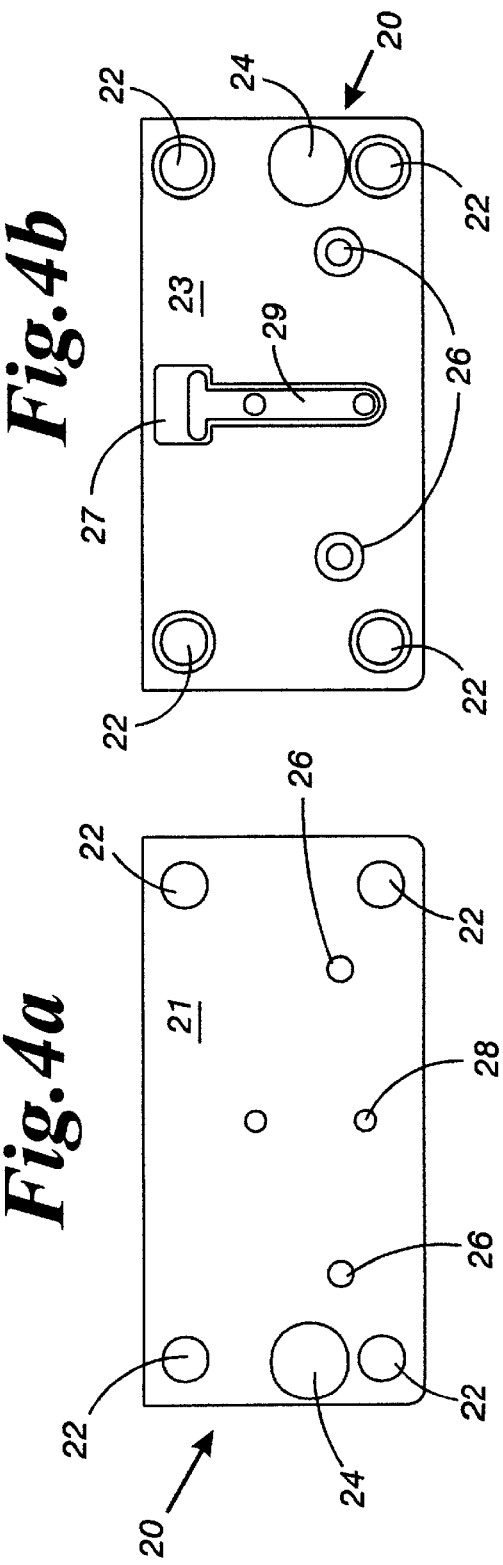

LABEL TAMP

FIELD OF THE INVENTION

The present invention relates generally to an apparatus for applying a linerless adhesive label to a container, such as a box or shipping carton. More particularly, the invention is a label tamp for applying a linerless adhesive label to the outside of a container that is improperly aligned with the axis of the label tamp.

BACKGROUND OF THE INVENTION

Manufacturers of products who ship their goods in a container, such as a box or shipping carton, often desire to apply a label to the outside of the container. The label typically has identifying information, such as product codes, stock or lot numbers, bar codes and shipping data, printed thereon to identify the manufacturer, the contents of the container or the destination of the container. The label has a first side on which the identifying information is printed, and a second side opposite the first side which is coated with a pressure sensitive adhesive. The second, or adhesive, side of the label is applied to the outside of the container so that the identifying information on the first, or printed, side of the label may be read, such as by scanning with an electronic reader.

The label most often used for this purpose is commonly known as linerless label stock because the adhesive side of the label is not protected by a liner coated with a release film. In automated manufacturing facilities that utilize a production line, the label may be mechanically applied to the container when the container is transported on a conveyor to a labeling station. A preferred mechanism for applying the label to the container is a label applicator, also known as a label tamp. The label tamp includes a tamp head that is secured to a tamp head mounting plate on a tamp arm at one end of an axially movable tamp cylinder having an axis of extension that is generally normal to the outside surface of the container on which the label is to be applied. The cylinder may be pneumatic or hydraulic driven, but typically is pneumatic to accommodate the speed of the container along the production line.

With the tamp cylinder retracted, a label is transferred to the tamp head from a label transfer tray coated with a release film, or directly from a printer positioned adjacent the tamp head A stream of air from a blow tube may be directed at the forward face of the tamp head to properly position the label, and a vacuum may be drawn on the tamp head to retain the printed side of the label against the forward face of the tamp head. The tamp cylinder is then extended in the direction of the container until the adhesive side of the label contacts the outside surface of the container on which the label is to be applied, or until the adhesive side of the label is only a slight distance from the outside surface of the container on which the label is to be applied. In the latter case, the vacuum is reversed so that a stream of air is provided to blow the label onto the outside surface of the container from the slight distance.

Label tamps of the previously described type often experience difficulty transferring the label from the transfer tray or the printer to the tamp head and delivering the label to the container. In practice, the label can get caught on the printer or the blow tube as the tamp cylinder is extended in the direction of the container. The adhesive side of the label may come in contact with the printer or the blow tube, for example, if the tamp head and the printer head are not properly aligned or if the tamp cylinder extends towards the container before the label is completely clear of the printer head. The label may also come in contact with the printer or the blow tube if the vacuum drawn on the tamp head is insufficient or irregular.

Assuming that the label is properly transferred to the tamp head and delivered to the container, previously known label tamps operate without difficulty as long as the container is transported to the labeling station of the production line with the outside surface of the container on which the label is to be applied normal to the axis of extension of the tamp cylinder. If the container is transported to the labeling station in a different orientation, the label may not be securely applied to the outside of the container, or worse yet, the label may be wrinkled, and thus unreadable. In the event that a container is improperly aligned with the axis of extension of the tamp cylinder, it may be necessary to shut-down the production line to correct the alignment problem. Naturally, any delay in the operation of the production line results in a corresponding decrease in productivity, and hence profit.

In the case in which the adhesive side of the label contacts the outside surface of the container on which the label is to be applied, it is also possible that the force exerted on the container by the tamp cylinder will exceed the transverse coefficient of friction between the container and the conveyor. This situation is most likely to occur when the production line is alternately utilized for lightweight and heavy containers. If the force exerted by the tamp cylinder is adjusted to apply a label to a heavy container when a lightweight container is transported to the labeling station, that force may exceed the transverse coefficient of friction between the container and the conveyor. As a result, the container may be damaged, or the label may be incorrectly applied as previously described.

As is now apparent, there is a need for a label tamp that transfers and delivers a linerless adhesive label to a container without the possibility that the label will get caught on the printer or the blow tube. Further, there is a need for a label tamp that securely applies a label to a container even if the outside surface of the container on which the label is to be applied is improperly aligned with the axis of extension of the tamp cylinder.

In particular, there is a need for a label tamp that delivers a linerless adhesive label to a container and securely applies the label to the container without wrinkling the label even if the outside surface of the container on which the label is to be applied is improperly aligned with the axis of extension of the tamp cylinder. It is also apparent that there is a need for a label tamp that applies a linerless adhesive label to a lightweight container without exceeding the transverse coefficient of friction between the container and the conveyor.

SUMMARY OF THE OBJECTS OF THE INVENTION

Accordingly, it is a principle object of the invention to provide a label tamp that delivers and applies a linerless adhesive label to the outside surface of a container.

It is a further, and more particular, object of the invention to provide a label tamp that delivers a linerless adhesive label to a container without the possibility that the label will get caught on the printer or the blow tube.

It is a further, and more particular, object of the invention to provide a label tamp that securely applies a linerless adhesive label to a container even if the outside surface of the container on which the label is to be applied is improperly aligned with the axis of extension of the tamp cylinder.

It is yet another object of the invention to provide a label tamp that securely applies a linerless adhesive label to a container without wrinkling the label even if the outside surface of the container on which the label is to be applied is improperly aligned with the axis of extension of the tamp cylinder.

It is yet another object of the invention to provide a label tamp that securely applies a linerless adhesive label to a lightweight container on a conveyor without exceeding the transverse coefficient of friction between the container and the conveyor.

SUMMARY OF THE INVENTION

The invention is a label tamp for delivering and applying a linerless adhesive label to the outside surface of a container, such as a box or shipping carton, that is transported on a conveyor to the labeling station of a production line. The label tamp delivers the label to the container without the possibility that the label will get caught as it is extended by the label tamp towards the container. In addition, the label tamp securely applies the label to the container even if the outside surface of the container on which the label is to be applied is improperly aligned with the axis of extension of the label tamp. Accordingly, the label will reach the container and will not become detached once it is applied to the container or be applied wrinkled, and thus unreadable. Further, the label tamp securely applies a linerless adhesive label to a lightweight container without exceeding the transverse coefficient of friction between the container and the conveyor.

The label tamp includes a tamp cylinder which defines an axis of extension that is generally normal to the outside surface of the container. The tamp cylinder may be pneumatically or hydraulically driven, but preferably is pneumatically driven to accommodate the high speed that is typical of modern production lines. The label tamp further includes a tamp arm secured to the tamp cylinder such that the tamp arm is alternately extensible and retractable along the axis of extension defined by the tamp cylinder, a tamp arm base plate that is rigidly fixed to the tamp arm and a tamp head assembly that is attached to the tamp arm base plate.

With the tamp cylinder retracted, a label having identifying information, such as product codes, stock or lot numbers, bar codes and shipping data, printed thereon to identify the manufacturer, the contents of the container or the destination of the container, is transferred to the tamp head assembly. The label is printed, for example on a thermal transfer printer positioned adjacent the tamp head assembly, and transferred to the tamp head assembly, for example by a pair of opposed roller guides. A blow tube for directing a stream of air against the adhesive side of the label as the label is transferred may be provided ahead of the printer to properly position the label on the tamp head assembly.

Preferably, the label tamp includes vacuum means for drawing a vacuum to retain the printed side of the label against the forward face of the tamp head assembly. The tamp cylinder is extended in the direction of the container until the adhesive side of the label contacts the outside surface of the container on which the label is to be applied. Preferably, the label tamp includes means for releasing the label from the tamp head assembly when the adhesive side of the label contacts the outside surface of the container. The releasing means may, for example, be the vacuum means with the direction of the air flow reversed.

In a preferred embodiment, the label tamp further includes means for linearly actuating the tamp head assembly such that the tamp head assembly is linearly movable relative to the tamp arm. Thus, the tamp head assembly may be raised or lowered relative to the tamp arm base plate so that the label will not get caught on the printer or the blow tube. Preferably, the means for linearly actuating includes a lift plate secured to the tamp head assembly and at least one linear actuator secured the tamp arm base plate. The lift plate preferably has at least one recess for receiving the at least one linear actuator therein. Most preferably, the lift plate has a pair of parallel recesses for receiving a pair of linear actuators secured to the tamp arm base plate. Accordingly, the tamp head assembly is linearly movable relative to the tamp arm base plate, and thus relative to the tamp arm.

In a preferred embodiment, the tamp head assembly includes a tamp head mounting plate, a tamp head and means for resiliently mounting the tamp head to the tamp head mounting plate. In particular, the tamp head is rotatable about orthoganol axes perpendicular to the axis of extension of the tamp cylinder, and is linearly movable in a direction parallel to the axis of extension of the tamp cylinder. Thus, if a container is transported to the labeling station on the conveyor with the outside surface of the container on which the label is to be applied improperly aligned with the axis of extension of the tamp cylinder, the resiliently mounted tamp head automatically conforms the forward face of the tamp head to the orientation of the outside surface of the container.

The means for resiliently mounting the tamp head to the tamp head mounting plate preferably includes at least one shoulder bolt and at least one cylindrical spring positioned on the shoulder bolt between the tamp head and the tamp head mounting plate. The tamp head and the tamp head mounting plate preferably have at least one hole for receiving a corresponding one of the at least one shoulder bolt and the at least one spring therein. Most preferably, the means for resiliently mounting the tamp head to the tamp head mounting plate includes four shoulder bolts and four cylindrical springs positioned on the shoulder bolts between the tamp head and the tamp head mounting plate. An end of each of the springs is received in one of four counterbored holes arranged in a rectangular pattern on the rearward face of the tamp head and on the forward face of the tamp head mounting plate.

When the adhesive side of the label contacts the outside surface of the container on which the label is to be applied, the tamp head pivots about at least one of the orthoganol axes perpendicular to the axis of extension of the tamp cylinder to conform the forward face of the tamp head to the orientation of the outside surface of the container. Accordingly, the label is securely applied to the container, without wrinkling. Further, because the tamp head is resiliently mounted to the tamp head mounting plate (and thus movable in a direction parallel to the axis of extension of the tamp cylinder), the force exerted on the container by the tamp cylinder is relieved as long as the spring force does not exceed the transverse coefficient of friction between the container and the conveyor.

BRIEF DESCRIPTION OF THE DRAWINGS

The foregoing and other objects of the invention will become more readily apparent by referring to the following detailed description and the accompanying drawings in which:

FIG. 4a is a plan view of the rearward face of the tamp head mounting plate of the label tamp of FIG. 1;

FIG. 4b is a plan view of the forward face of the tamp head mounting plate of the label tamp of FIG. 1;

FIG. 5a is a plan view of the rearward face of the resiliently mounted tamp head of the label tamp of FIG. 1;

FIG. 5b is a plan view of the forward face of the resiliently mounted tamp head of the label tamp of FIG. 1;

DETAILED DESCRIPTION OF THE PREFERRED EMBODIMENTS

Figure 1:
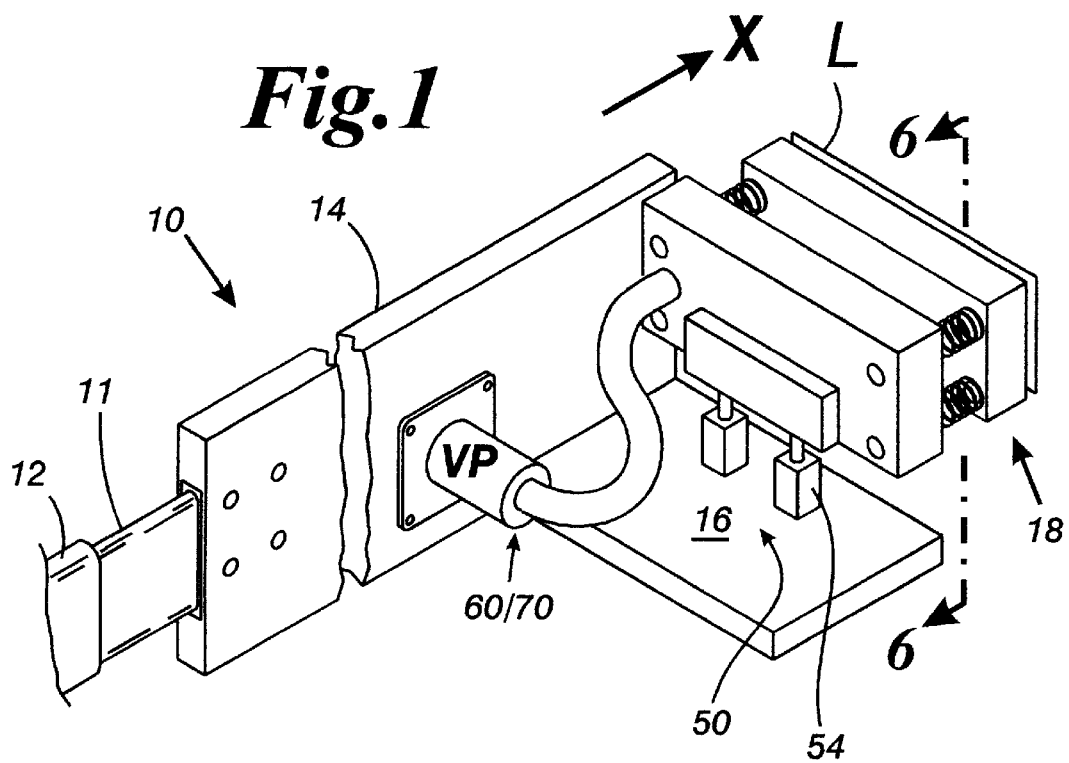
FIG. 1 is a perspective view of a label tamp according to the invention.

Referring now to the accompanying drawings in which like reference numerals indicate like parts, FIG. 1 illustrates a label tamp, indicated generally at 10, according to the invention. The label tamp 10 is commonly utilized to deliver and apply a linerless adhesive label L to the outside surface of a container, such as a box or shipping carton, that is transported on a conveyor to the labeling station of a production line. The label tamp 10 delivers the label L to the container without the possibility that the label will get caught as it is extended by the label tamp towards the container. In addition, the label tamp 10 securely applies the label L to the container even if the outside surface of the container on which the label is to be applied is improperly aligned with the axis of extension of the label tamp. Accordingly, the label L will reach the container and will not become detached once it is applied to the container or be wrinkled, and thus unreadable. Further, the label tamp 10 securely applies a linerless adhesive label L to a lightweight container without exceeding the transverse coefficient of friction between the container and the conveyor.

The label tamp 10 comprises a tamp cylinder 12 which defines an axis of extension X that is parallel to the longitudinal axis of the tamp cylinder and generally normal to the outside surface of the container. The extension rod 11 of the tamp cylinder 12 may be pneumatically or hydraulically driven, but preferably is pneumatically driven to accommodate the high speed that is typical of modern production lines. The label tamp 10 further comprises a tamp arm 14 secured to the extension rod 11 of the tamp cylinder 12 such that the tamp arm is alternately extensible and retractable along the axis of extension X defined by the tamp cylinder. The label tamp 10 further comprises a tamp arm base plate 16 that is rigidly fixed to the tamp arm 14 and a tamp head assembly 18 that is attached to the tamp arm base plate 16.

Figure 2:
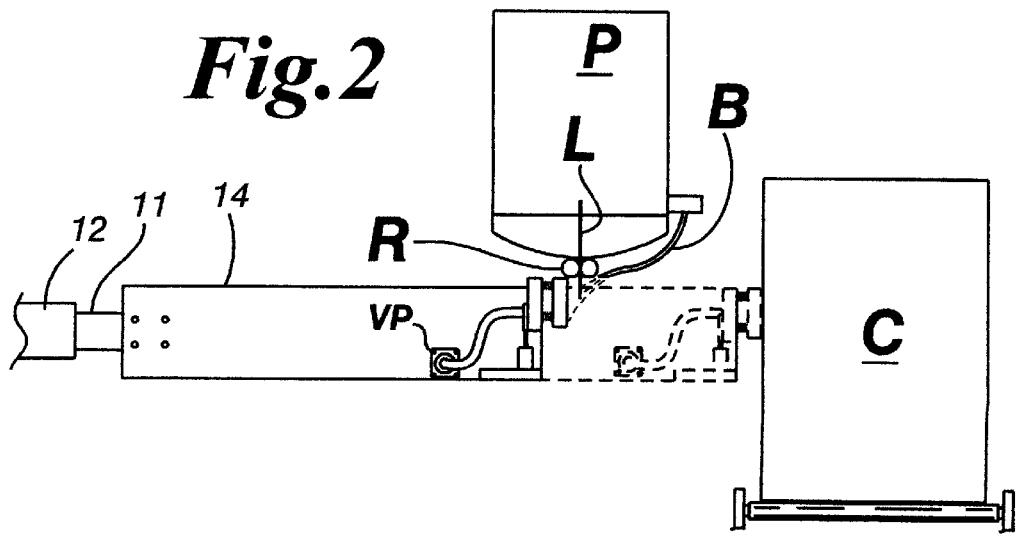
FIG. 2 is a side view of the label tamp of FIG. 1 showing the tamp cylinder in the retracted position, indicated by the solid lines, to receive a linerless adhesive label from a printer and in the extended position, indicated by the dashed lines, to apply the label to the outside surface of a container.

Operation of the label tamp 10 is best illustrated in FIG. 2. With the tamp cylinder 12 retracted, a label L having identifying information, such as product codes, stock or lot numbers, bar codes and shipping data, printed thereon to identify the manufacturer, the contents of the container or the destination of the container, is transferred to the tamp head assembly 18. The label L may be transferred to the tamp head assembly 18 in any known manner, but preferably is transferred to the tamp head assembly by a pair of opposed roller guides R. The label L may be transferred from, for example, a conventional label tray or a conventional printer. Preferably, the label L is printed on a thermal transfer printer P positioned adjacent the tamp head assembly 18, Accordingly, the identifying information printed onto the Label L by the printer P can be variable as described in the co-pending patent application assigned to the assignee of the present invention. A blow tube B for directing a stream of air against the adhesive side of the label L as the label is transferred may be provided ahead of the printer P and above the tamp head assembly 18 to properly position the label on the forward face of the tamp head assembly.

Preferably, the label tamp further comprises vacuum means 60 for drawing a vacuum on the tamp head assembly 18 to retain the printed side of the label L against the forward face of the tamp head assembly as the tamp arm 14 is extended by the extension rod 11 of the tamp cylinder 12. Preferably, vacuum means 60 comprises a vacuum pump VP secured to the tamp arm 14 of the label tamp 10. Once the label L is positioned on the forward face of the tamp head assembly 18, the tamp cylinder 12 is extended in the direction of the container until the adhesive side of the label contacts the outside surface S of the container C on which the label is to be applied. Preferably, the label tamp 10 further comprises releasing means 70 for releasing the label L from the tamp head assembly 18 when the adhesive side of the label contacts the outside surface S of the container C. The releasing means 70 preferably is the vacuum means 60 with the direction of the air flow through the vacuum pump VP reversed.

In a preferred embodiment, the label tamp 10 further comprises means 50 for linearly actuating the tamp head assembly 18 such that the tamp head assembly is linearly movable relative to the tamp arm 14. Thus, the tamp head assembly 18 may be raised or lowered relative to the tamp arm 14 so that the label L will not get caught on the printer P or the blow tube B. Preferably, the means 50 for linearly actuating comprises a lift plate 52 secured to the tamp head assembly 18 and at least one linear actuator 54 secured the tamp arm base plate 16. The lift plate 52 preferably has at least one recess 56 for receiving the at least one linear actuator 54 therein. Most preferably, the lift plate 52 has a pair of parallel recesses 56 for receiving a pair of linear actuators 54 secured to the tamp arm base plate 16. Accordingly, the tamp head assembly 18 is linearly movable relative to the tamp arm base plate 16, and thus relative to the tamp arm 14.

Figure 3A:
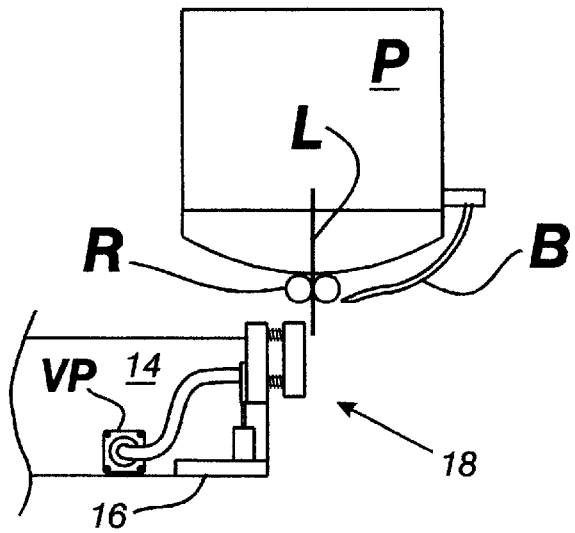
FIG. 3a is a side view of the label tamp of FIG. 1 showing the tamp cylinder retracted and the tamp head assembly lowered by the means for linearly actuating the tamp head assembly.
Figure 3B:
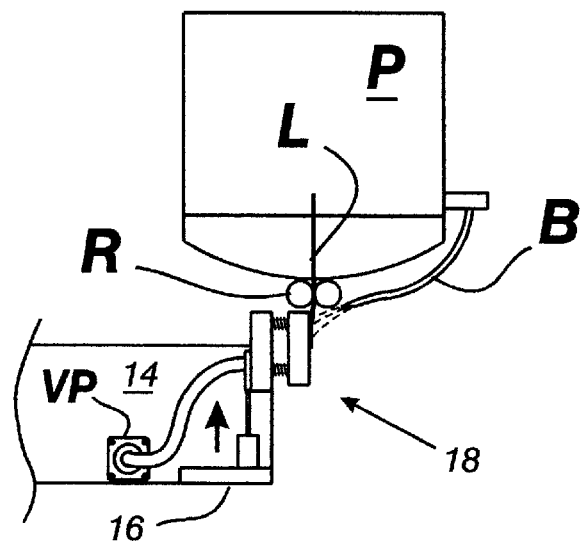
FIG. 3b is a side view of the label tamp of FIG. 1 showing the tamp cylinder retracted and the tamp head assembly raised by the means for linearly actuating the tamp head assembly to receive a label from the printer.
Figure 3C:
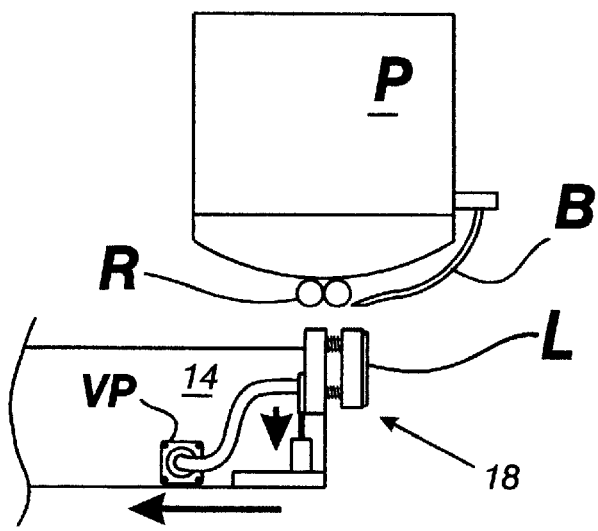
FIG. 3c is a side view of the label tamp of FIG. 1 showing the tamp head assembly lowered by the means for linearly actuating the tamp head assembly and the tamp cylinder extended to apply the label to the outside surface of a container.

As illustrated in FIG. 3a, the tamp cylinder 12 of the label tamp 10 is initially retracted and the tamp head assembly 18 is lowered by the means 50 for linearly actuating the tamp head assembly. As illustrated in FIG. 3b, with the tamp cylinder 12 of the label tamp 10 still retracted, the tamp head assembly 18 is raised by the means 50 for linearly actuating the tamp head assembly to receive a label L from the printer P. As illustrated in FIG. 3c, the tamp head assembly 18 is lowered by the means 50 for linearly actuating the tamp head assembly and the tamp cylinder 12 is then extended to apply the label L to the outside surface S of the container C. Once the label L is applied to the container C, the tamp cylinder 12 is retracted to initiate another cycle of the label tamp 10.

In a preferred embodiment, the tamp head assembly 18 comprises a tamp head mounting plate 20, a tamp head 30 and means 40 for resiliently mounting the tamp head to the tamp head mounting plate. In particular, the tamp head 30 is rotatable about orthoganol axes perpendicular to the axis of extension X of the tamp cylinder 12, and is linearly movable in a direction parallel to the axis of extension of the tamp cylinder. Thus, as will be described, if a container C is delivered to the labeling station on the conveyor with the outside surface S of the container on which the label L is to be applied improperly aligned with the axis of extension X of the tamp cylinder 12, the resiliently mounted tamp head 30 automatically conforms the forward face of the tamp head to the orientation of the outside surface of the container.

The rearward face 21 of the tamp head mounting plate 20 is shown in FIG. 4a and the forward face 23 of the tamp head mounting plate is shown in FIG. 4b. The tamp head mounting plate 20 is a generally rectangular plate suitably sized for mounting the tamp head 30 thereon. Preferably, the tamp head mounting plate 20 is 2 inches high, about 4 inches wide and is about 0.50 inches thick. The rearward face 31 of the tamp head 30 is shown in FIG. 5a and the forward face 33 of the tamp head is shown in FIG. 5b. The tamp head 30 is a generally rectangular plate suitably sized for receiving a standard sized label L thereon. Preferably, the tamp head 30 is about 2.25 inches high, about 4.50 inches wide and is about 0.50 inches thick. Thus, the tamp head 30 accommodates a label L up to about 2.00 inches high and up to about 4.25 inches wide.

The tamp head mounting plate 20 has a first plurality of through holes 22. Preferably, the first plurality of holes 22 consists of four holes arranged in a generally rectangular pattern. As shown in FIG. 4b, the holes 22 are counterbored from the forward face 23 of the tamp head mounting plate 20 to form a spring seat 25 (FIG. 6) for a purpose to be described. Preferably, each of the first plurality of holes 22 has a diameter of 0.312 inches, with a 0.50 inch diameter by 0.125 inch deep counterbore from the forward face 23 of the tamp head mounting plate 20. The tamp head mounting plate 20 further has a single through hole 24 to provide clearance for the air line from the vacuum pump VP of the vacuum means 60 and its associated pneumatic fitting. Preferably, the hole 24 has a diameter of 0.625 inches.

The tamp head mounting plate 20 further has a second plurality of counterbored through holes 26. Preferably, the second plurality of holes 26 consists of two holes, each having a diameter of 0.162 inches, with a 0.3125 inch diameter by 0.25 inch deep counterbore from the forward face 23 of the tamp head mounting plate 20. The holes 26 are counterbored from the forward face 23 of the tamp head mounting plate 20 to receive a pair of hex-head, externally threaded bolts therein which secure the lift plate 52 of the means 50 for linearly actuating the tamp head assembly 18 to the tamp head mounting plate. The tamp head mounting plate 20 further has a pair of 0.125 inch diameter through holes 28 and a 0.31 inch deep pocket 27 formed from the forward face 23 of the tamp head mounting plate. The holes 28 receive a pair of hex-head, externally threaded bolts therein from the rearward face 21 of the tamp head mounting plate 20 which secure a motion sensor 29 positioned in the pocket 27 for a purpose to be described.

The tamp head 30 has a third plurality of through holes 32 that correspond to the first plurality of holes 22 in the tamp head mounting plate 20. Likewise, the third plurality of holes 32 preferably consists of four holes arranged in a generally rectangular pattern. The holes 32 are tapped 10–24 through with a 0.500 inch diameter by 0.110 inch deep counterbore from the rearward face 31 of the tamp head 30 to form a spring seat 35 (FIG. 6) for a purpose to be described. The tamp head 30 further has a single hole 34 that corresponds to the single through hole 24 in the tamp head mounting plate 20. The hole 34 is tapped ⅛ NPT by 0.250 inches deep from the rearward face 31 of the tamp head 30 to accept a standard NPT pneumatic fitting that is connected to the vacuum pump VP.

The tamp head 30 further has a fourth plurality of holes 36 drilled from the forward face 33 of the tamp head 30. Preferably, the fourth plurality of holes 36 consists of four 0.188 inch diameter holes drilled 0.25 inches deep from the forward face 33 of the tamp head 30. Each of the holes 36 is in fluid communication with the hole 34 through a series of bores 38 0.152 inches in diameter and 2.50 inches deep drilled inwardly from predetermined locations around the periphery of the tamp head 30. The openings of the bores 38 are tapped to accept plugs (not shown) to close-off the open ends of the bores on the periphery of the tamp head 30. Thus, vacuum may be drawn or air may be blown by the vacuum pump VA as desired through the fourth plurality of holes 36 provided on the forward face 33 of the tamp head 30.

Figure 6:
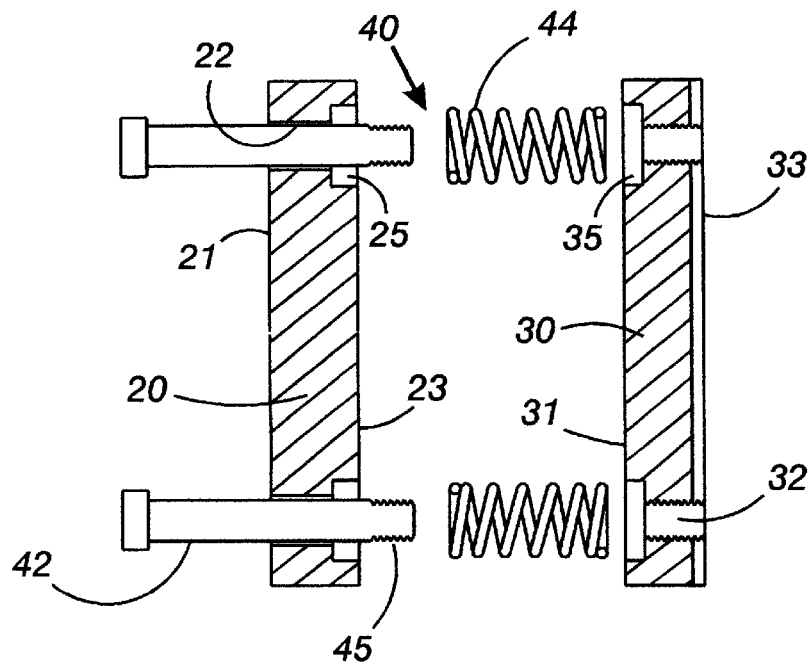
FIG. 6 is a sectional view of the tamp head mounting plate and the resiliently mounted tamp head of the label tamp of FIG. 1 taken along the line 6—6 of FIG. 1.

As shown in FIG. 6, the means 40 for resiliently mounting the tamp head 30 to the tamp head mounting plate 20 preferably comprises at least one hex-head shoulder bolt 42 and at least one cylindrical spring 44 positioned on the shoulder bolt between the tamp head and the tamp head mounting plate. As previously described, the tamp head mounting plate 20 and the tamp head 30 each have at least one hole 22, 32, respectively, for receiving a corresponding one of the at least one shoulder bolt 42 and the at least one spring 44 therein. One end of the at least one spring 44 is seated in the spring seat 25 formed by the counterbored hole 22 on the forward face 23 of the tamp head mounting plate 20. The other end of the at least one spring 44 is seated in the spring seat 35 formed by the counterbored hole 32 on the rearward face 31 of the tamp head 30. The at least one shoulder bolt 42 comprises an externally threaded portion 45 at one end for engaging the tapped portion of the hole 32 provided in the tamp head 30.

Most preferably, the means 40 for resiliently mounting the tamp head 30 to the tamp head mounting plate 20 comprises four shoulder bolts 42 and four cylindrical springs 44 positioned on the shoulder bolts between the tamp head 30 and the tamp head mounting plate 20. Accordingly, the means 40 mounts the tamp head 30 to the tamp head mounting plate 20 so that the tamp head is movable relative to the tamp head mounting plate, and thus relative to the axis of extension X of the tamp cylinder 12. In particular, the tamp head 30 is rotatable about orthoganol axes perpendicular to the axis of extension X of the tamp cylinder 12, and is linearly movable in a direction parallel to the axis of extension of the tamp cylinder.

Figure 7:
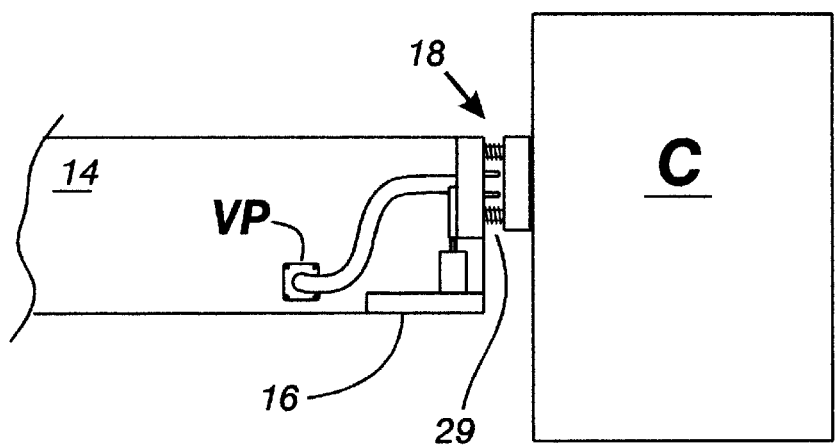
FIG. 7 is a schematic diagram illustrating the label tamp of FIG. 1 applying a linerless adhesive label to the outside surface of a container that is properly aligned with the axis of extension of the tamp cylinder.
Figure 8:
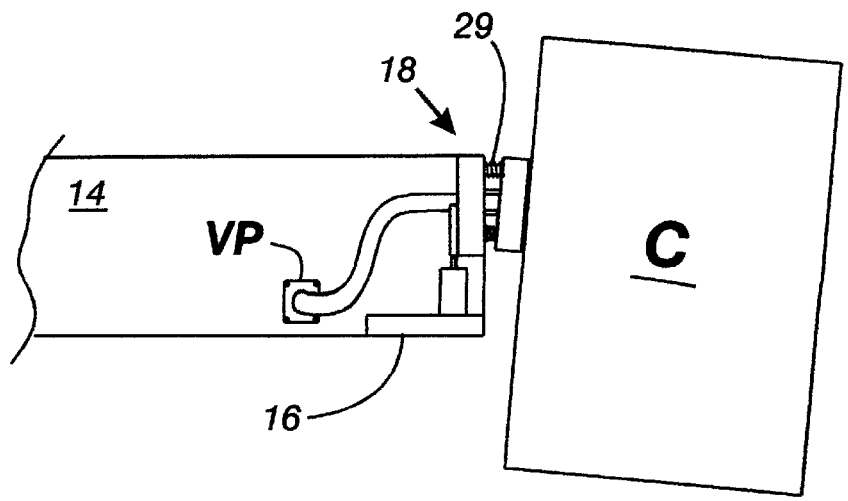
FIG. 8 is a schematic diagram illustrating the label tamp of FIG. 1 applying a linerless adhesive label to the outside surface of a container that is improperly aligned with the axis of extension of the tamp cylinder.

As illustrated in FIGS. 7 and 8, if the container C is transported to the labeling station on the conveyor with the outside surface S of the container on which the label L is to be applied improperly aligned with the axis of extension X of the tamp cylinder 12, the resiliently mounted tamp head 30 automatically conforms the forward face 33 of the tamp head to the orientation of the outside surface of the container. When the adhesive side of the label L contacts the outside surface S of the container C on which the label is to be applied, the tamp head 30 pivots about at least one of the orthoganol axes perpendicular to the axis of extension X of the tamp cylinder 12 to conform the forward face 33 of the tamp head 30 to the orientation of the container. Thus, the label L will not became detached once it is applied to the container C, and will not be applied wrinkled.

Further, the tamp head 30 is movable in a direction parallel to the axis of extension X of the tamp cylinder 12. Accordingly, the tamp head 30 will move under the force exerted on the tamp head by the transverse coefficient of friction between the container C and the conveyor. Thus, the force exerted on the container C by the tamp cylinder 11 will be relieved. In a preferred embodiment, a predetermined movement of the tamp head 30 along the axis of extension X of the tamp cylinder 12 may be detected by the motion sensor 29 and utilized to produce an electrical signal to command the label tamp 10 to return to the retracted position.

It is to be understood that the foregoing description and specific embodiments are merely illustrative of the best mode of the invention and the principles thereof, and that various modifications and additions may be made to the apparatus by those skilled in the art without departing from the spirit and scope of this invention, which is therefore understood to be limited only by the scope of the appended claims.

That which is claimed is:

1. A label tamp for delivering and applying a linerless adhesive label having a printed side and an adhesive side to the outside surface of a container, said label tamp comprising:

a tamp cylinder defining an axis of extension;

a tamp arm secured to said tamp cylinder such that said tamp arm is extensible and retractable along the axis of extension defined by said tamp cylinder;

a tamp arm base plate rigidly fixed to said tamp arm;

a tamp head assembly attached to said tamp arm base plate;

means for linearly actuating said tamp head assembly relative to said tamp arm comprising at least one linear actuator secured to said tamp arm base plate; and a lift plate secured to said tamp head assembly; said lift plate cooperating with said at least one linear actuator so that said tamp head assembly is linearly movable relative to said tamp arm base plate in a direction perpendicular to the axis of extension defined by said tamp cylinder.

2. A label tamp according to claim 1 further comprising vacuum means for drawing a vacuum on said tamp head assembly to retain the printed side of the linerless adhesive label opposite the outside surface of the container.

3. A label tamp according to claim 2 wherein said vacuum means comprises:

a vacuum pump having a vacuum line; and a plurality of vacuum ports formed in said tamp head assembly, each of said vacuum ports in fluid communication with the vacuum line of said vacuum pump.

4. A label tamp according to claim 1 further comprising releasing means for releasing the label from said tamp head assembly when the adhesive side of the label contacts the outside surface of the container.

5. A label tamp according to claim 4 wherein said releasing means comprises:

a pump having an outlet line; and a plurality of outlet ports formed in said tamp head assembly, each of said outlet ports in fluid communication with the outlet line of said pump.

6. A label tamp for delivering and applying a linerless adhesive label having a printed side and an adhesive side to the outside surface of the container, said label tamp comprising:

a tamp cylinder defining an axis of extension;

a tamp arm secured to said tamp cylinder such that said tamp arm is extensible and retractable along the axis of extension defined by said tamp cylinder;

a tamp arm base plate rigidly fixed to said tamp arm;

a tamp head assembly attached to said tamp arm base plate, said tamp head assembly comprising a tamp head mounting plate and a tamp head; and means for resiliently mounting said tamp head to said tamp head mounting plate so that said tamp head is rotatable about each of orthogonal axes perpendicular to the axis of extension defined by said tamp cylinder and is linearly movable in a direction parallel to the axis of extension defined by said tamp cylinder.

7. A label tamp according to claim 6 wherein said means for resiliently mounting said tamp head to said tamp head mounting plate comprises:

at least one shoulder bolt; and at least one cylindrical spring positioned on said at least one shoulder bolt between said tamp head and said tamp head mounting plate; and wherein each of said tamp head and said tamp head mounting plate has at least one hole for receiving a corresponding one of said at least one shoulder bolt and said at least one spring therein.

8. A label tamp according to claim 7 wherein said means for resiliently mounting said tamp head to said tamp head mounting plate comprises:

four shoulder bolts; and four cylindrical springs, each of said springs positioned on a corresponding one of said shoulder bolts between said tamp head and said tamp head mounting plate; and wherein each of said tamp head and said tamp head mounting plate has four holes for receiving a corresponding one of said shoulder bolts and a corresponding on of said springs therein, the holes of said tamp head and said tamp head mounting plate arranged in a rectangular pattern.

9. A label tamp according to claim 8 wherein each of the holes of said tamp head and said tamp head mounting plate are counterbored to receive an end of the corresponding one of said springs therein.

10. A label tamp according to claim 6 further comprising a motion sensor for sensing movement of said tamp head relative to said tamp head mounting plate along the axis of extension defined by said tamp cylinder.

11. A label tamp according to claim 6 further comprising vacuum means for drawing a vacuum on said tamp head to retain the printed side of the linerless adhesive label opposite the outside surface of the container.

12. A label tamp according to claim 11 wherein said vacuum means comprises:

a vacuum pump having a vacuum line; and a plurality of vacuum ports formed in said tamp head, each of said vacuum ports in fluid communication with the vacuum line of said vacuum pump.

13. A label tamp according to claim 6 further comprising releasing means for releasing the label from said tamp head when the adhesive side of the label contacts the outside surface of the container.

14. A label tamp according to claim 13 wherein said releasing means comprises:

a pump having an outlet line; and a plurality of outlet ports formed in said tamp head, each of said outlet ports in fluid communication with the outlet line of said pump.

15. A label tamp for delivering and applying a linerless adhesive label having a printed side and an adhesive side to the outside surface of a container, said label tamp comprising:

a tamp cylinder defining an axis of extension;

a tamp arm secured to said tamp cylinder such that said tamp arm is extensible and retractable along the axis of extension defined by said tamp cylinder;

a tamp arm base plate rigidly fixed to said tamp arm;

a tamp head assembly attached to said tamp arm base plate, said tamp head assembly comprising a tamp head mounting plate and a tamp head;

means for linearly actuating said tamp head assembly relative to said tamp arm comprising a pair of linear actuators secured to said tamp arm base plate; and a lift plate secured to said tamp head assembly, said lift plate cooperating with said pair of linear actuators so that said tamp head assembly is linearly movable relative to said tamp arm base plate in a direction perpendicular to the axis of extension defined by said tamp cylinder; and means for resiliently mounting said tamp head to said tamp head mounting plate so that said tamp head is rotatable about each of orthogonal axes perpendicular to the axis of extension defined by said tamp cylinder and is linearly movable in a direction parallel to the axis of extension defined by said tamp cylinder, said resiliently mounting means comprising four shoulder bolts; and four cylindrical springs, each of said springs positioned on a corresponding one of said shoulder bolts between said tamp head and said tamp head mounting plate;

wherein each of said tamp head and said tamp head mounting plate has four counterbored holes for receiving a corresponding one of said shoulder bolts and an end of a corresponding one of said springs therein, the holes of said tamp head and said tamp head mounting plate being arranged in a rectangular pattern.

* * * * *